HANCOCK & RICHARDSON.
HORSE DETATCHING APPARATUS.

No. 105,198. Patented July 12, 1870.

Witnesses:
L. S. Mabee
Alex. F. Roberts

Inventor:
J. C. Hancock
E. P. Richardson
Per _____ Attorneys.

United States Patent Office.

JOHN C. HANCOCK, OF CHARLESTOWN, AND EDWARD P. RICHARDSON, OF SOMERVILLE, MASSACHUSETTS.

Letters Patent No. 105,198, dated July 12, 1870.

IMPROVEMENT IN HORSE-DETACHING APPARATUS.

The Schedule referred to in these Letters Patent and making part of the same.

*To all whom it may concern:*

Be it known that we, JOHN C. HANCOCK, of Charlestown, in the county of Middlesex and State of Massachusetts, and EDWARD P. RICHARDSON, of Somerville, in the county of Middlesex and State of Massachusetts, have invented a new and useful Improvement in Horse-detaching Apparatus; and we do hereby declare that the following is a full, clear, and exact description thereof, which will enable others skilled in the art to make and use the same, reference being had to the accompanying drawing forming part of this specification, in which—

Similar letters of reference indicate corresponding parts.

Our invention has for its object to furnish an improved apparatus for detaching the horse or horses from the vehicle instantly, when, from fright or other cause, he or they may have become unmanageable, and which shall at the same time be simple in construction, and easily operated; and It consists in the construction and combination of the various parts of the apparatus, as hereinafter more fully described.

A is the main lever, the rear part of which extends beneath the forward part of the carriage-body B, above the reach C, and which is pivoted to a support, D, attached to the head-block above the forward axle E.

Figure 1:
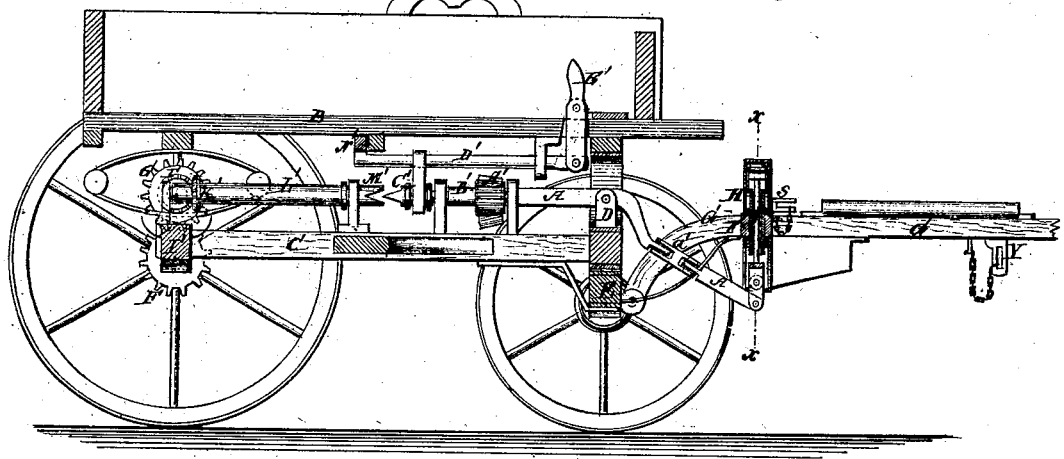
Figure 1 is a vertical longitudinal section of a wagon to which our improvement has been attached.
Figure 2:
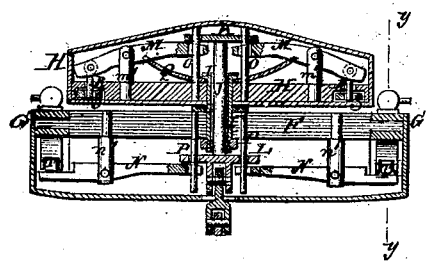
Figure 2 is a detail sectional view, taken through the line $x\ x$, fig. 1.
Figure 3:
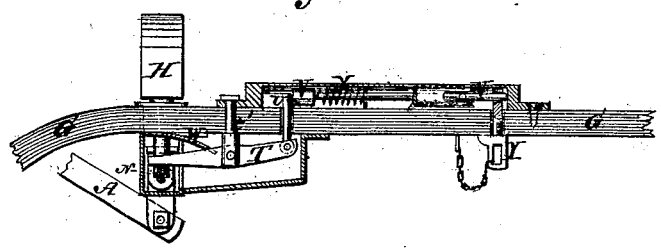
Figure 3 is a detail sectional view, taken through the line $y\ y$, fig. 2.

In the forward part of the lever A, about midway between the pivot D and the cross-bar F of the thills G, is formed a double joint, $a'$, which is so constructed, as shown in fig. 1, as to have a free lateral movement, while being rigid vertically. This allows the thills and forward axle to be turned freely in either direction in guiding the vehicle.

H is the whiffletree, which is pivoted to the cross-bar F of the thills G by a metallic tube, I, instead of the usual bolt.

Through the tube I passes the rod J, the lower end of which is connected with the forward end of the jointed lever A by a double-jointed connection, so that the rod J may move up and down vertically, while the forward end of the lever A moves in the arc of a circle.

To the upper and lower ends of the rod J are attached plates K and L, which rest upon the inner ends of the levers M and N.

O and P are two pairs of rods, which are secured to the whiffletree H and cross-bar F, respectively, and which pass through holes in the plates K and L, and in the levers M and N, to guide and steady said levers in their movements.

Q are springs attached to the whiffletree H, and which press against the under side of the inner ends of the levers M, to raise the said levers, and, with them, the rod J, when the lever A is released.

The levers M are pivoted to supports $m'$, attached to the whiffletree H, and to their outer ends are pivoted pins or bolts R, which pass down through metallic sockets secured in the ends of the whiffletree H, and into which, from the forward side of the whiffletree, are inserted the castings S, which should be attached to the ends of the tugs, so that the said pins R may pass through the eyes of the said castings S, securely connecting the horse to the whiffletree.

By this construction, when the rear end of the lever A is moved upward, the rod J will be drawn downward, operating the levers M, and raising the pins R from the castings S, allowing the said castings to be withdrawn from the whiffletree by the forward movement of the horse.

The levers N are pivoted to supports $n'$, attached to the cross-bar F of the thills G, and upon their outer ends rest the rear ends of the levers T, which are pivoted to supports $t'$, secured to the thills G a little in front of the cross-bar F.

To the forward ends of the levers T are pivoted pins or bolts U, which pass up through the thills G at the rear end of the rods V.

W are springs attached to the thills G, the free ends of which rest upon the rear ends of the levers T, and which bring the levers N and T into their former positions as soon as the lever A is released. The springs Q and W also hold the levers steady, and prevent the pins from being accidentally withdrawn by the jarring of the vehicle.

The rods V work in tubes attached to the thills G, or in tubular recesses formed in said thills, and are provided with coiled springs X, which hold them back against the pins U, so that, when the said pins U are withdrawn, by operating the lever A, the springs X will force the rods V back.

The forward ends of the rods V, when pushed forward, pass through holes in breeching-hooks Y, which should be attached to the breeching or hold-back straps, and which enter the tubes in which the rods V work from the under side of the thills G, so that when the rods V spring back, upon the withdrawal of the pins U, by operating the lever A, the said breeching-hooks Y may at once drop from the thills. The tugs and breeching are released at exactly the same time by simply operating the lever A.

The outer side of the tube in which the rod V and spring X work is slotted, for the passage of guide-pins attached to the rod V, to guide the said rod, and enable it to be pushed forward conveniently in securing the breeching-hook Y.

The thills Q are supported, when the horse is detached, by the springs O', attached to the axle E, and which rest against the lower side of the said thills.

The lever A may be operated from the vehicle by a lever, or by other convenient means, or it may be connected with the brakes, so as to detach the horse or horses and apply the brakes at the same time. In the latter case, the lever A may have a short cross-head attached to its rear end, upon the side of which are formed teeth that mesh into the teeth of the small gear-wheel A', attached to the forward end of the short shaft B', which works in bearings attached to the reach C.

With the rear end of the shaft B' is connected a clutch, C', which is connected with a rod, D', sliding longitudinally in supports attached to the under side of the vehicle body, the forward end of which rod is pivoted to the lower end of the lever E', the upper end of which extends up into such a position that it may be conveniently operated by the driver.

The rear end of the rod D' is attached to the brake-bar N'.

Upon the hub of one of the rear wheels is formed, or to it is attached, a gear-wheel, F', the teeth of which mesh into the teeth of the gear-wheel G', attached to the end of the short shaft H', which revolves in bearings attached to the rear axle I', and to the other or inner end of which is attached a small bevel gear-wheel, J', the teeth of which mesh into the teeth of the small bevel gear-wheel K', attached to the rear end of the shaft L', which revolves in bearings attached to the rear part of its reach O, and which has a clutch, M', formed upon its rear end, so that, when the lever E' is operated, the clutch C' will be thrown into gear with the clutch M', so that the horse will be detached by the forward movement of the vehicle.

Having thus described our invention,

We claim as new and desire to secure by Letters Patent—

1. The combination of the lever A a', tube I, rod J, plates K L, levers M, pins R, castings S, springs Q, levers N, levers T, springs W, pins U, rods V, springs X, and breeching-hooks Y, with each other and with the head-block of the forward axle, cross-bar F, thills G, and whiffletree H, substantially as herein shown and described, and for the purpose set forth.

2. The combination of the gear-wheel A', shaft B', clutch C', bar D', lever E', brake-bar N', gear-wheels F' G', shaft H', gear-wheels J' K', shaft L', and clutch M', with each other and with the lever A and its connections, substantially as herein shown and described, and for the purpose set forth.

JOHN C. HANCOCK.
EDWARD P. RICHARDSON.

Witnesses:
HANNAH HANCOCK,
MARY E. HANCOCK.